J. H. & J. L. AUBLE.
LAWN MOWER.
APPLICATION FILED FEB. 7, 1912.
1,039,475.
Patented Sept. 24, 1912.
2 SHEETS—SHEET 1.
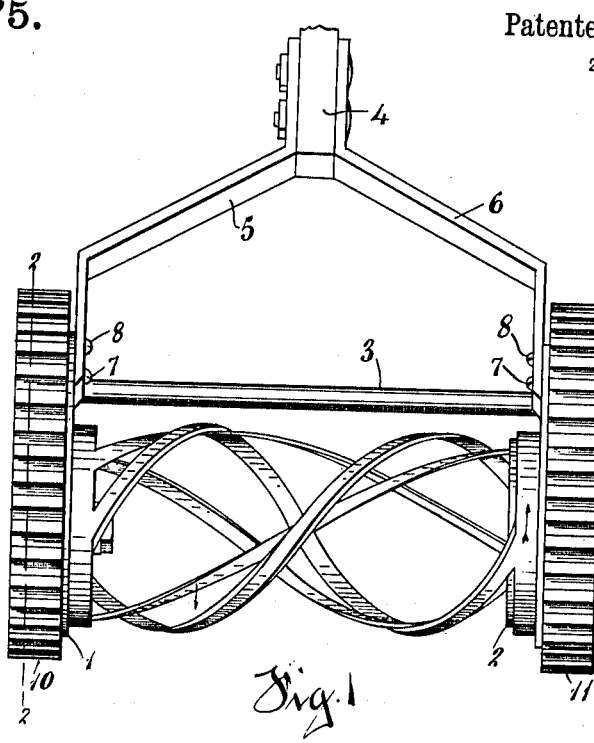
Fig. 1
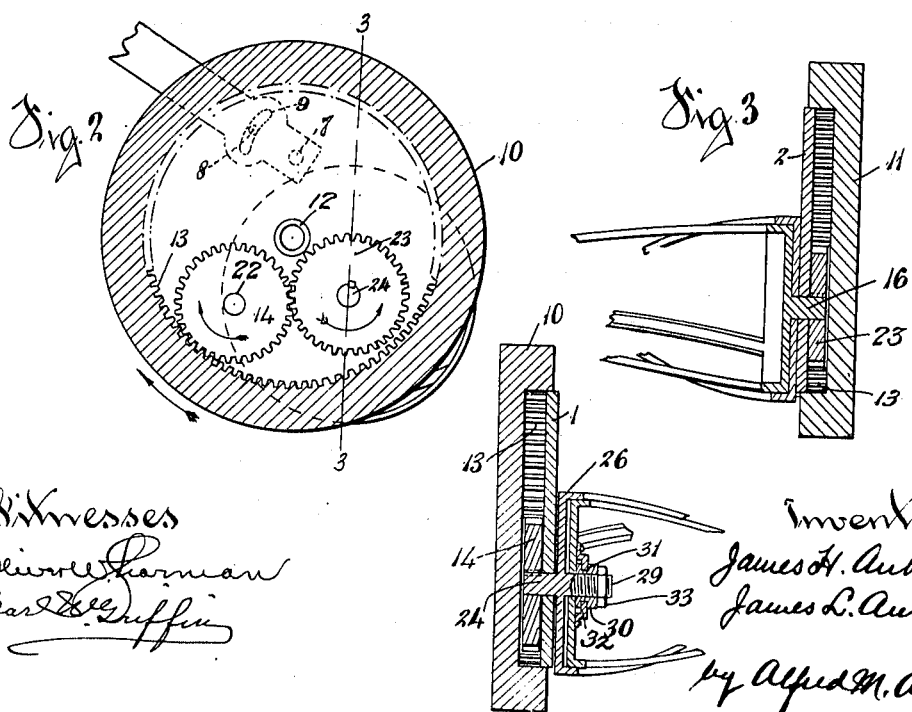
Fig. 2
Fig. 3
Witnesses
Inventors
James H. Auble
James L. Auble
by Alfred M. Allen
Attorney J. H. & J. L. AUBLE.
LAWN MOWER.
APPLICATION FILED FEB. 7, 1912.
1,039,475.
Patented Sept. 24, 1912.
2 SHEETS—SHEET 2.
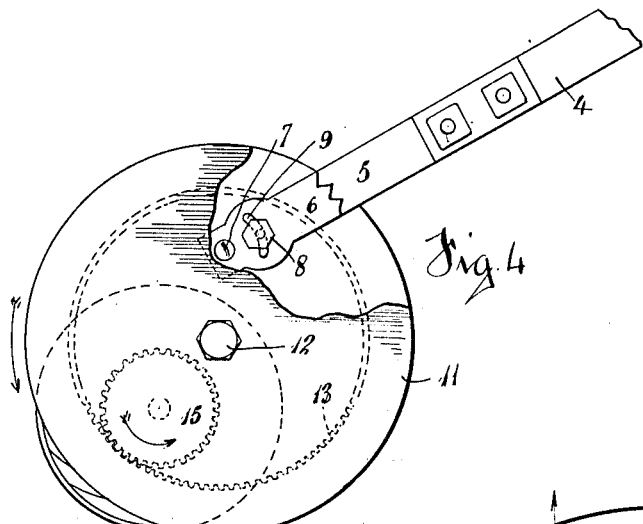
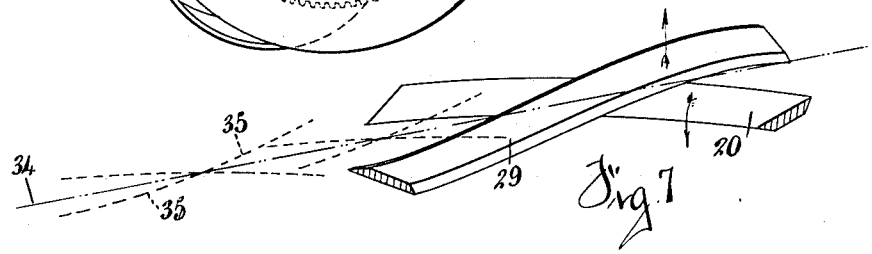
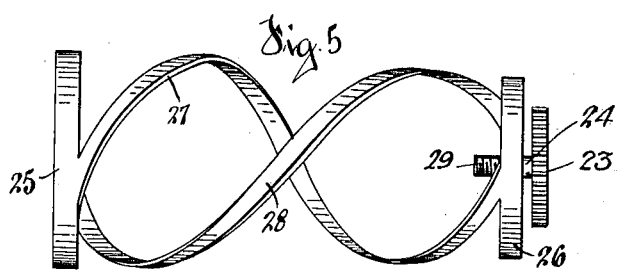
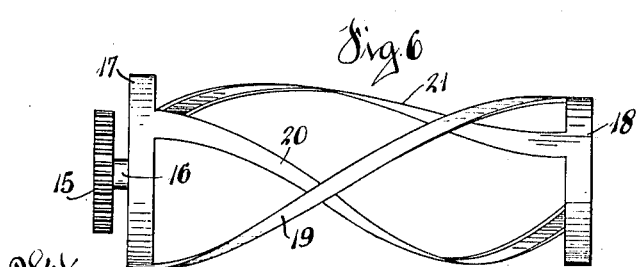
Witnesses
Oliver Shannon
Earl D. Griffin
Inventors
James H. Auble
James L. Auble
by Alfred M. Allen
Attorney

UNITED STATES PATENT OFFICE.

JAMES H. AUBLE AND JAMES L. AUBLE, OF CINCINNATI, OHIO, ASSIGNORS OF ONE-THIRD TO H. A. BARRETT, OF CINCINNATI, OHIO.

LAWN-MOWER.

1,039,475.  Specification of Letters Patent.  Patented Sept. 24, 1912.

Application filed February 7, 1912. Serial No. 675,970.

*To all whom it may concern:*

Be it known that we, JAMES H. AUBLE and JAMES L. AUBLE, citizens of the United States, and residents of the city of Cincinnati, in the county of Hamilton and State of Ohio, have invented certain new and useful Improvements in Lawn-Mowers, of which the following is a full, clear, and exact description, reference being had to the accompanying drawings, forming part of this specification.

Our invention relates to improvements in the construction and operation of cutting knives for clipping, cutting and mowing machines generally, and more particularly in the embodiment thereof as hereinafter described, adapted for use in mowing machines and especially lawn mowers.

The object of our invention is to provide a construction of rotary cutting knives cylindrically and spirally arranged to coöperate with each other by rotation in opposite directions, whereby the rapidity of the cutting operation may be very materially increased, the transverse diameter of the spiral can be decreased to gain power and the material to be cut can be acted upon by the knives at all points of rotation.

In the drawings, Figure 1 is a front elevation of our improved construction as applied to a lawn mower. Fig. 2 is a vertical transverse section through one of the driving gears, taken on the line 2, 2 of Fig. 1. Fig. 3 is a vertical longitudinal section, taken on the line 3, 3, of Fig. 2, broken away at the middle portion, with the two ends separated. Fig. 4 is a side elevation of the opposite driving wheel, partly broken away. Fig. 5 is a plan view of one set of the spirally arranged cutting knives. Fig. 6 is a similar view of the other set. Fig. 7 is a diagrammatic illustration of the cutting operation of the knives.

For the lawn mower construction which we have illustrated in the drawings, the framework or body portion of the machine comprises two disks 1 and 2, rigidly connected together by a rod or shaft 3, and to these disks the handle 4 of the implement is attached by the bracket arms 5, 6. These arms are pivoted each to its respective disk on a stud 7, and the angle of the handle is adjusted for different elevations by means of a set screw 8, which takes through a radial slot 9 in each arm, the set screw being arranged to clamp the handle in any desired position within the limits of the adjustment. The rod or bar 3 connecting the two disks 1 and 2 is located some distance to the rear of the axis of the two disks, so as not to impede or block the cutting space of the implement. Mounted on each of these disks 1 and 2, to rotate freely thereon, are the carrying and driving wheels 10, 11, of the machine, the carrying wheels being held in rotatable position by a bolt or screw 12, taking into its respective disk. Each of the carrying wheels is hollowed out and provided with an internal gear 13 on the inner surface of the peripheral flange of the wheel, and this peripheral gear is engaged by its pinion 14 on one side, and 15 for the opposite gear. The pinion 15 is mounted on a stud 16 which has its bearing in the disk 2, and this stud carries on the inside the spirally arranged cutter, shown separately in Fig. 6. This cutter comprises the end disks 17, 18, with the cylindrically and spirally arranged cutting knives 19, 20 and 21, extending from disk to disk, and for the pitch of the spiral we prefer to give each of these spiral plates a half turn between its ends, although it will be understood that the pitch of the spiral may be varied for different requirements. The cutter as a whole is slightly conical, or formed in the shape of a truncated cone, with the driven end 17 of larger diameter. For the opposite carrying wheel and driving gear, the pinion 14 is mounted on a stud 22 on the disk 1, and this pinion engages a second pinion 23, mounted on a stud 24, having its bearing in the disk 1, and carrying on its inner end the spirally arranged cutter illustrated in Fig. 5. This spirally arranged cutter comprises at its inner or driven end a flanged disk 26, the flange of which fits over the disk 18 of the inner spiral. This spiral cutter is also formed in conical shape, so that the flat surfaces of the spiral knives 27 and 28 shall fit around and make cutting engagement with the spiral knives 19, 20 and 21. The stud 24, upon which the outer set of spiral knives is mounted is screw-threaded on its inner end 29, and on this screwthreaded end is mounted a nut 30, provided with an annular groove 31, which is engaged by lugs 32 on the disk 18, so that by adjusting the nut 30, any lost motion between the two sets of spiral knives may be taken up and the spirals may be adjusted with reference to each other for wear. A lock nut 33 is provided to hold the two sets of spiral knives in their adjusted position.

The pitch of the spiral knives 27 and 28 is preferably about half the pitch of the inner set of spiral knives, and each of the knives 27, 28, is preferably given a complete turn between its ends. In any event, the two sets of spirals are so arranged with reference to each other that they may give the proper shearing cut as the edges pass each other. Inasmuch as the inner set of spiral knives is driven directly by the pinion in engagement with the peripheral gear on its driving wheel, this set of spirals will rotate in the same direction that the carrying wheel is moving. For the other driving wheel with which the pinion 14 engages, and which pinion in turn engages the pinion 23, this outer set of spiral knives will be driven in the opposite direction, so as the implement is pushed over the ground, the two sets of spirals will rotate rapidly in opposite directions. It will also be evident that the two driving wheels and the sets of spiral knives driven thereby will rotate independently of each other, so that in turning corners one wheel can rotate more rapidly than the other.

The effect of the rotation of the two sets of spiral cutting knives coöperating with each other and moving in opposite directions is to furnish a plurality of cutters operating at all points of the circumference of the spirals, and the fact that the spirals move in opposite directions very largely increases the rapidity of the cutting operation.

Where a single rotating spirally arranged set of knives are employed coöperating with a fixed bar, the spirals must necessarily be made large to obtain a proper stroke and the pitch of the spiral must necessarily be very great, in order to give the proper shearing cut. With our construction, however, inasmuch as the cutting edges are both spirally arranged, a much more pronounced spiral may be given the knives, and the cutting surfaces are in much freer position to attack the material to be cut. The lines of cut with our construction are also substantially at right angles to the advance of the implement, these lines of cut being shown by the line 34 in Fig. 7, in which view two of the knives are shown, and the dotted lines 35 indicate the several positions of the cutting edges at the point of cut.

Inasmuch as a plurality of spirally disposed knives are employed for each of the spiral cutters, the lines of cut as the implement is advanced, follow each other with great rapidity, so that the grass is cut, or the material clipped very evenly. As the spirals are open, and wherever any two of the oppositely moving plates are passing each other, a cutting position is presented so that any height of grass can be cut with our implement, and there is no danger of clogging. The cutting knives, moreover, can be advanced in their location with reference to the carrying wheels, so that the cutters can extend slightly beyond the periphery of these carrying wheels, as illustrated in Figs. 2 and 4, and as the two sets of knives move past each other in opposite directions the cylindrical diameter of the cutters may be made much smaller and still obtain the necessary shearing cut than can be obtained where a single spiral cutter with spirally disposed knives is provided to coöperate with a straight cutting blade. By decreasing the diameter of the cylindrical cutters, we can thus gain power, and our construction is therefore much more effectual with high grass.

Having thus described our invention, what we claim as new and desire to secure by Letters Patent, is:—

1. In a machine of the character specified, a pair of spiral cutters of different pitch arranged to coöperate with each other to make a shearing cut with the one cutter mounted inside the opposing cutter, and means for rotating said cutters in opposite directions.

2. In a machine of the character specified, a pair of spiral cutters of different pitch, each spiral cutter provided with a plurality of spirally arranged cutting knives, the knives of each cutter arranged to coöperate with the knives of the opposing cutter with the one cutter mounted inside the opposing cutter, and means for rotating said cutters in opposite directions.

3. In a machine of the character specified, a pair of spiral cutters of different pitch, each cutter provided with a plurality of spirally arranged knives, the knives of each cutter being of the same pitch, with one cutter mounted inside the opposing cutter, and means for rotating said cutters in opposite directions.

4. In a machine of the character specified, a pair of spiral cutters of different pitch, each cutter provided with a plurality of spirally arranged knives, the knives of each cutter being of the same pitch, with one cutter mounted inside the opposing cutter, and the two cutters in the shape of truncated cones, with means for adjusting the cones longitudinally and means for rotating the cutters in opposite directions.

5. In a mower, the combination with a framework, of carrying wheels mounted thereon, to rotate independently, and a pair of spiral cutters of different pitch, arranged to coöperate with each other to make a shearing cut, mounted on said frame with the one cutter mounted inside the opposing cutter, and means to rotate said cutters in opposite directions with the advance of the implement.

6. In a mower, the combination with a framework and carrying wheels mounted to rotate thereon, and a pair of spiral cutters of different pitch, arranged to coöperate with each other to make a shearing cut, mounted on said frame with the one cutter mounted inside the opposing cutter, and connecting mechanism intermediate each cutter and its respective carrying wheel for rotating the cutters in opposite directions with the rotation of the carrying wheels.

7. In a mower, the combination with a framework and carrying wheels mounted to rotate thereon, and a pair of spiral cutters of different pitch, arranged to coöperate with each other to make a shearing cut, mounted on said frame with the one cutter mounted inside the opposing cutter, with gearing intermediate each cutter and its respective carrying wheel and an additional gear for one of said cutters whereby the cutters will be rotated in opposite directions with the rotation of the carrying wheels.

8. In a mower, the combination with a framework and carrying wheels mounted to rotate thereon, of a pair of spiral cutters of different pitch, each spiral cutter provided with a plurality of spirally arranged cutting knives, the knives of each cutter arranged to coöperate with the knives of the opposing cutter, each cutter mounted in the frame with the one cutter mounted inside the opposing cutter, and means to rotate said cutters in opposite directions with the advance of the implement.

9. In a mower, the combination with a framework and carrying wheels mounted to rotate thereon, of a pair of spiral cutters of different pitch, each spiral cutter provided with a plurality of spirally arranged cutting knives, the knives of each cutter arranged to coöperate with the knives of the opposing cutter, each cutter mounted in the frame with the one cutter mounted inside the opposing cutter, and connecting mechanism intermediate each cutter and its respective carrying wheel for rotating the cutters in opposite directions with the rotation of the carrying wheels.

10. In a mower, the combination with a framework and carrying wheels mounted to rotate thereon, of a pair of spiral cutters of different pitch, each spiral cutter provided with a plurality of spirally arranged cutting knives, the knives of each cutter arranged to coöperate with the knives of the opposing cutter, each cutter mounted in the frame with the one cutter mounted inside the opposing cutter, with gearing intermediate each cutter and its respective carrying wheel, and an additional gear for one of said cutters whereby the cutters will be rotated in opposite directions with the rotation of the carrying wheels.

11. In a mower, the combination with a framework and carrying wheels mounted to rotate thereon, of a pair of spiral cutters of different pitch, each cutter provided with a plurality of spirally arranged knives, the knives of each cutter being of the same pitch, with one cutter mounted inside the opposing cutter and means to rotate said cutters in opposite directions with the advance of the implement.

12. In a mower, the combination with a framework and carrying wheels mounted to rotate thereon, of a pair of spiral cutters of different pitch, each cutter provided with a plurality of spirally arranged knives, the knives of each cutter being of the same pitch, with one cutter mounted inside the opposing cutter, and connecting mechanism intermediate each cutter and its respective carrying wheel for rotating the cutters in opposite directions with the rotation of the carrying wheels.

13. In a lawn mower, the combination with a framework and carrying wheels mounted to rotate thereon, of a pair of spiral cutters of different pitch, each cutter provided with a plurality of spirally arranged knives, the knives of each cutter being of the same pitch, with one cutter mounted inside the opposing cutter, with gearing intermediate each cutter and its respective carrying wheel, and an additional gear for one of said cutters whereby the cutters will be rotated in opposite directions with the rotation of the carrying wheels.

14. In a mower, the combination with a framework and carrying wheels mounted to rotate thereon, of a pair of spiral cutters of different pitch, each cutter provided with a plurality of spirally arranged knives, the knives of each cutter being of the same pitch, with one cutter mounted inside the opposing cutter, and the two cutters in the shape of truncated cones, with means for adjusting the cones longitudinally, and connecting mechanism intermediate each cutter and its respective carrying wheel for rotating the cutters in opposite directions with the rotation of the carrying wheels.

15. In a mower, the combination with a framework and carrying wheels mounted to rotate thereon, of a pair of spiral cutters of different pitch, each cutter provided with a plurality of spirally arranged knives, the knives of each cutter being of the same pitch, with one cutter mounted inside the opposing cutter, and the two cutters in the shape of truncated cones, with means for adjusting the cones longitudinally, with gearing intermediate each cutter and its respective carrying wheel and an additional gear for one of said cutters whereby the cutters will be rotated in opposite directions with the rotation of the carrying wheels.

JAMES H. AUBLE.
JAMES L. AUBLE.

Witnesses:
EARL W. GRIFFIN,
ANNA F. DIENST.